United States Patent [19]

Adderley

[11] 4,066,418

[45] Jan. 3, 1978

[54] METHOD OF SEALING AN INTERCELL CONNECTION IN A MULTI-CELL ELECTRIC STORAGE BATTERY

[75] Inventor: Edward Adderley, Hadfield, England

[73] Assignee: Sociedad Espanola Del Acumulador Tudor S.A., Madrid, Spain

[21] Appl. No.: 562,943

[22] Filed: Mar. 28, 1975

[30] Foreign Application Priority Data

Jan. 21, 1975 United Kingdom .................. 2657/75

[51] Int. Cl.² ...................... H01M 2/24; H01M 6/02; B29C 6/04
[52] U.S. Cl. ...................... 29/623.5; 29/460; 29/527.4; 29/731; 264/261; 264/267; 264/293
[58] Field of Search ............... 264/261, 262, 263, 266, 264/267, 277, 46.5, 46.7, 36, 138, 154, 274, 276, 259, 293; 425/289, 292; 249/90, 95; 29/522, 460, 623.1, 623.5, 731; 136/175

[56] References Cited

U.S. PATENT DOCUMENTS

| 801,222 | 10/1905 | Corcoran | 249/90 |
| 2,004,784 | 6/1935 | Evans | 249/90 |
| 3,444,618 | 5/1969 | Sorlie | 264/272 |
| 3,575,366 | 11/1967 | Blum et al. | 264/277 |
| 3,634,928 | 1/1972 | Falcioni | 29/522 |
| 3,857,156 | 12/1974 | Clark | 264/154 |
| 3,888,454 | 6/1975 | Treadway | 249/90 |

Primary Examiner—James B. Lowe

[57] ABSTRACT

In a method for sealing a substantially straight intercell connector bar passing through an opening in the upper part of an intercell partition of an electric storage battery, a mould is used having a marginal portion fitting against the face of the partition and defining a cavity, the mould comprising a body open at the bottom, and a closure movable horizontally from a closed position in which it extends under the bar to close the bottom of the cavity, to an open position in which it permits removal of the mould. The closure is formed with a cutter portion arranged to gouge or broach a groove in the upper or lower surface of the bar to ensure leak-proof closure of the mould.

8 Claims, 6 Drawing Figures

METHOD OF SEALING AN INTERCELL CONNECTION IN A MULTI-CELL ELECTRIC STORAGE BATTERY

This invention relates to methods and moulds for sealing intercell connectors in multicell electric storage batteries of the type in which the plates of neighbouring cells are connected by a substantially straight intercell connector bar passing through an opening in the upper part of an intercell partition.

As compared with intercell connectors which pass over the tops of the partitions, connections of the type referred to have the advantage that the connection can be more direct, thereby saving material and in addition reducing the internal resistance of the cell as well as economising space. At the same time care must be taken in the sealing of the joint between the partition and the bar since the joint may be near or even below the electrolyte level.

Various arrangements have been proposed or adopted for sealing intercell connectors of the type specified and an object of the present invention is to provide a simple and convenient arrangement, more particularly, although not exclusively, suitable for use with casings formed of a plastics material such as polypropylene.

The present invention may be regarded as a development of the arrangements described in U.S. Pat. Ser. No. 562,942, now abandoned, filed concurrently herewith in the names of Juan Antonio Lopez Doriga Lopez Doriga and Luis Alonso Suarez Infanzon and referred to herein as the companion application.

The companion application describes methods of sealing an intercell connection in a multicell electric storage battery in which the plates of neighbouring cells are connected by a substantially straight intercell connector passing through an opening in the upper part of an intercell partition, and which include placing over the intercell connector bar a mould having a marginal portion fitting against the face of the partition and defining a cavity, the mould comprising at least two relatively movable parts which are lowered relatively to the partition and moved relatively to one another in a generally horizontal direction transverse to the length of the connector bar so as to close the bottom of the cavity under the connector bar, introducing into the mould a plastics material which is compatible with the partition so as to seal the gap between the margins of the opening and the connector bar, and removing the mould.

The use of a removable mould results in economy since a single mould can be used for a large number of batteries.

Preferably the mould comprises two halves, one lying on each side of the partition, secured together to form a single moulding head, each half comprising a body which forms one side wall of the cavity and on the opposite side of the bar provides guides for a closure permitting it to move substantially horizontally from a closed position in which it extends under the bar to close the bottom of the cavity, to an open position in which the bar and moulded seal can move down relatively to, and out of, the mould. Moreover, the closure may also afford the end wall of the cavity under the connector bar.

The invention may be employed with a precast connector bar, the plates of opposite polarity of neighbouring cells being mechanically and electrically connected together before being inserted in the casing, in which case the bar will be received in an open-topped notch. Alternatively, the bar may be preformed and inserted through a hole in the partition before being burnt, welded or otherwise secured to the lugs of the plates. Again the bar may be cast in situ so as to extend through a hole in the partition as set forth in British Patent Specification No. 39775/74, corresponding to co-pending U.S. Ser. No. 505,309, now U.S. Pat. No. 3,988,169.

Particularly when the bar is cast in situ it may be difficult to ensure that its section is precisely rectangular and in particular the upper surface of a cast bar, due to surface tension, may be a convex curve or meniscus. This may be filed flat to enable it to mate and form a close fit with the mould, but in order to avoid the necessity for this in accordance with the present invention the closure has a cutter portion arranged to gouge or broach a groove in the upper and/or lower surface of the bar so as to close the cavity throughout the width of the bar.

Moreover, there is a possibility that slight variations in the width of the bar may occur and it may therefore be desirable to arrange the closure and an opposed part of the body to bite into the sides of the bar to close the cavity throughout the height of the bar.

In one form of the invention where the opening in the intercell partition is in the form of an open-topped notch through the lower part of which the intercell connector passes, the cavity of the mould extends up to the level of the top of the partition so as to fill the upper part of the notch above the bar with the sealing material.

As a further safeguard the method may include compressing the bar longitudinally, after moulding the seal, to cause it to expand within the sealing material.

The invention may be put into practice in various ways but one specific embodiment will now be described by way of example with reference to the accompanying drawings, in which:

FIG. 2 is an elevation of one half of the mould as seen from the partition, with the closure in the open position, and FIG. 3 is a similar view with the closure in the closed position;

FIG. 4 is a sectional elevation on the line 4—4 of FIG. 5;

FIG. 5 is an under-plan view, and

FIG. 6 is a perspective.

The invention will be described as applied to an intercell connector for a multicell electric storage battery having a casing formed of polypropylene.

The casing is of conventional form including intercell partitions 10 extending between side walls 11 and is provided with a lid also having partitions 12 extending between side walls 13.

Figure 1:
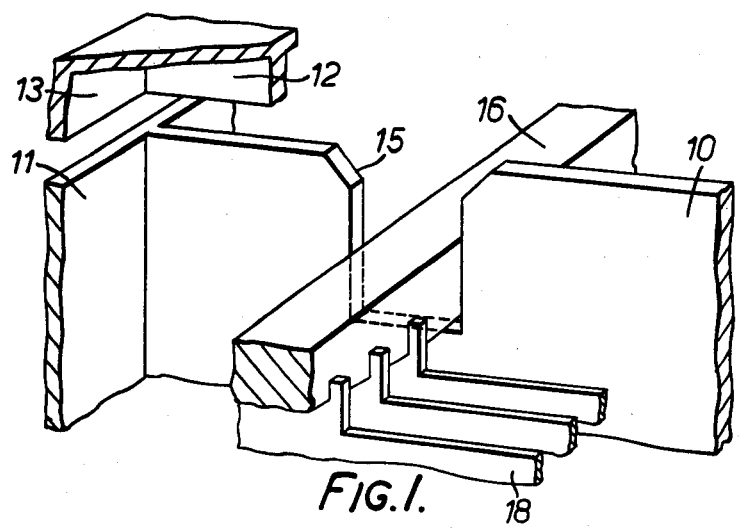
FIG. 1 is a diagrammatic perspective view of an intercell connector bar extending through a notch in a partition prior to the moulding operation.

As shown in FIG. 1 each intercell partition 10 is formed with a generally rectangular notch 15 in its upper edge at a point where the intercell connector is to be passed through it. The intercell connector comprises a straight bar 16 of rectangular section. The section may vary slightly from a precise rectangle as referred to below and in addition the bar may well taper away from the intercell partition so as to provide both the maximum strength and the maximum current carrying capacity at its middle portion where it passes through the partition. Thus the middle portion of the bar carries the current from the maximum number of plates 18 from one cell to its neighbour.

The plates and separators for all the cells of the battery are assembled together in a jig and connected together by their intercell connectors, then lowered into the casing so that the intercell connectors are received in the noches of the partitions as indicated diagrammatically in FIG. 1.

A mould is then placed over each notch.

The invention is particularly applicable where the intercell connector is cast in situ about the lugs of the plates, or indeed may be formed wholly or partly by melting the material of the lugs. Particularly in such cases there is the possibility that the dimensions of the section of the intercell connector bar may vary somewhat. In particular if the bar is cast in an open topped mould its upper surface is liable to exhibit a convex curve or meniscus. With the arrangements shown in the companion specification it may be desirable to file off such a meniscus before the sealing mould is applied, in order to obtain a water tight fit with the mould. Alternatively the bar may be cast with a top on the casting mould at the point where the sealing mould will engage it, but this renders the casting less simple.

FIGS. 2 to 6 show an embodiment in which, in accordance with the present invention, this is overcome by forming the closure of the mould with a cutter which broaches or gouges a groove in the upper surface of the bar as it is advanced to its closed position.

The mould comprises two halves rigidly bolted together and mounted astride the partition with one half extending down on each side of it.

The upper part of each half of the mould comprises a substantial block 51 from which depends a stout plate 52. The plate 52 has in it an interval U-shaped notch 53 near one end which will be between the intercell connector and the nearest side wall to it, and extends a considerable distance in the opposite direction. In its face presented to the partition (and to the viewer in FIGS. 2 and 3) the plate 52 has in it a shallow recess 54 extending for its whole length so that almost the whole of its surface, as indicated in FIG. 4, is spaced from and parallel to the surface of the intercell partition with the exception of a narrow rib 55 extending along its lower edge and contacting the partition. The top of the recess 54 communicates with half of an inlet passage 36 through which a fluid plastics material can be injected.

Figure 6:
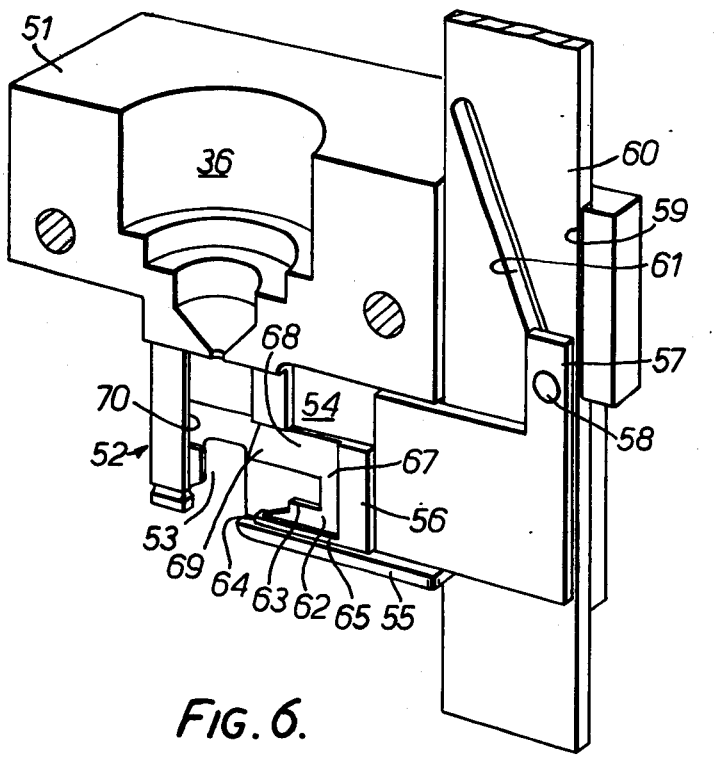
FIGS. 2 to 6 illustrate views of a mould which comprises a body and a closure which cuts a groove in the connector bar, in particular
Figure 2:
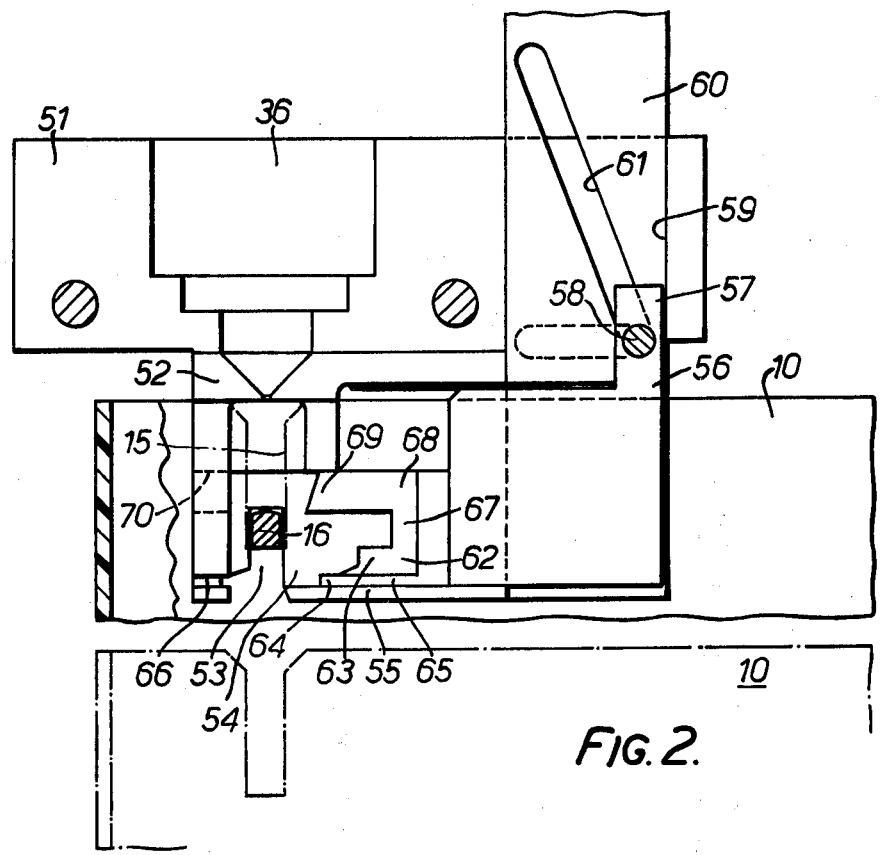
Figure 3:
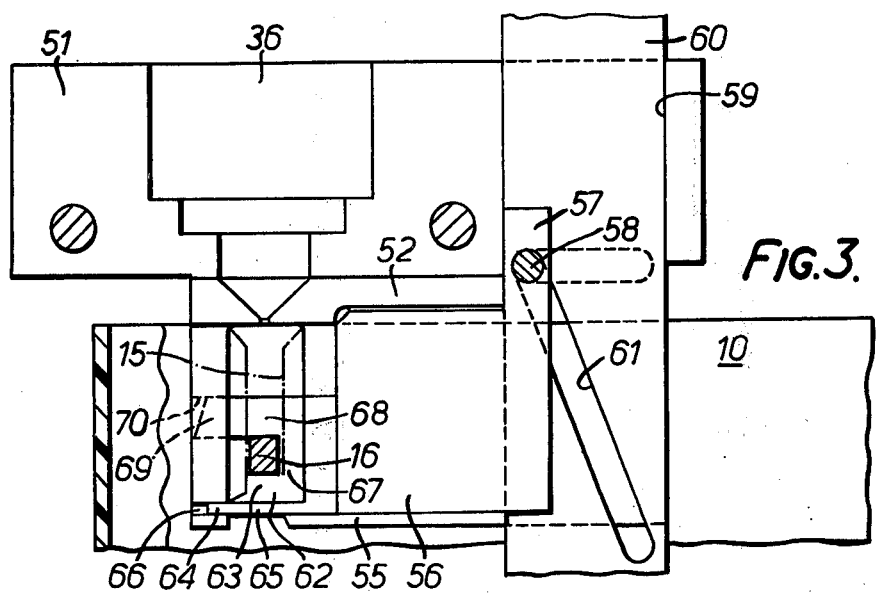
Figure 4:
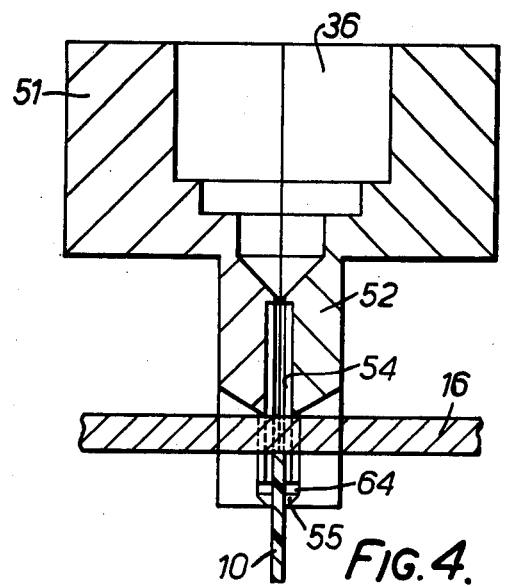
Figure 5:
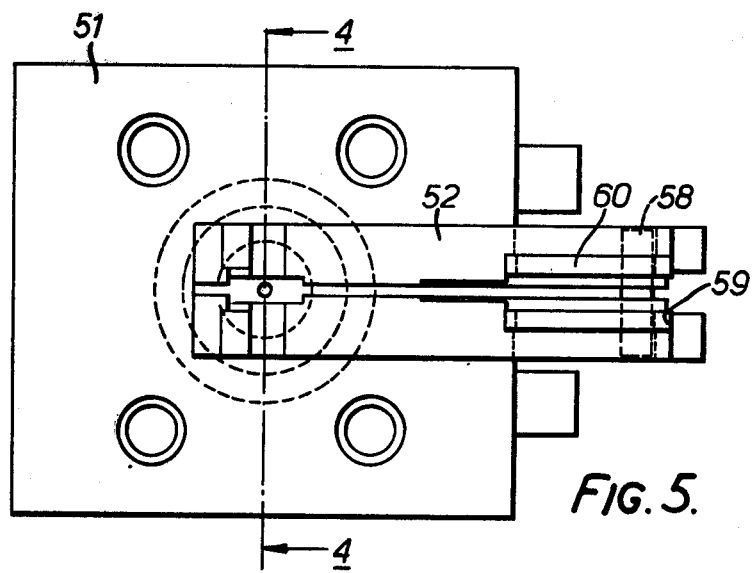

Mounted to slide in the recess 54 is a closure 56 in the form of a generally flat plate of the stepped form shown in FIGS. 2 and 3. At its right hand end as viewed in FIGS. 2 and 3 the closure 56 has an upstanding lug 57 carrying a pin 58. As shown in FIG. 6 the outer end of the block 51 is provided with a shallow flat groove 59 in which can slide an operating bar 60 having in it an oblique slot 61 into which the pin 58 projects. Thus as the operating bar 60 is moved up or down the oblique slot acts as a cam on the pin to move the closure between the open position of FIG. 2 and the closed position of FIG. 3.

Over the majority of its area the closure plate 56 has a thickness corresponding to the depth of the recess 54 in which it is received so as to occupy the whole space between the bottom of that recess and the face of the intercell partition.

At its forward end, however, it is provided with a portion 62 of reduced thickness. This comprises a foot 63 arranged to extend under the intercell connector in the closed position of FIG. 3. Below the foot the plate is again of its full thickness so as to provide a toe 64 at the end of a rib 65 which bears against the intercell partition so as to close the bottom of the mould. The toe 64 enters a groove or hole 66 in the body of the plate 64 when the closure reaches its closed position of FIG. 3.

Above the foot the leading end of the closure has a comparatively narrow vertical area 67 of reduced thickness so as to be spaced from the intercell partition to provide a side of the cavity around the one side (the right as viewed in FIGS. 2 and 3) of the intercell connector. Above this again is a top area 68 terminating at its left hand end in what may be termed a beak 69 having a sharp cutting edge to broach or gouge a shallow groove in the upper surface of the intercell connector bar. The beak is also received in a corresponding recess 70 in the body portion of the mould.

The arrangement shown is particularly adapted to quantity production and in a specific embodiment a group of moulds is assembled to seal all the intercell connectors of a battery simultaneously. In this case the moulds are preferably held stationary whilst each battery in turn is advanced beneath them on a conveyor and then raised on a lift so as to bring all the intercell partitions and connector bars up into register with the moulds which are then located astride the partitions and connector bars. The operating bars 60 are then actuated to close the closures of the moulds, and at the same time the beak of each closure broaches or gouges a shallow groove corresponding approximately to the depth of the meniscus formed across the top of the connector bar when it is cast in situ, so as to close the moulding cavity throughout the width of the bar except for the inlet passage 36 for the sealing material.

After the closure has been moved to the closed position of FIG. 3 the sealing material is injected and thereafter allowed to cool, after which the closure is returned to the open position of FIG. 2 and the battery lowered away from the moulds.

In addition the operating mechanism and the closure and other parts of the mould are so dimensioned that opposed faces of the mould will bite into the sides of the connector bar to allow for any variations in the horizontal width of the connector bar, and close the cavity throughout the height of the bar.

Alternatively or in addition the toe of the closure may be formed with a cutting edge to broach or gouge a groove in the underside of the connector bar, again to ensure satisfactory sealing. In particular if the connector bars are cast in situ with the battery in an inverted position it may be desirable to provide the foot with a cutting edge, whereas this may be unnecessary on the beak and indeed the beak may be omitted.

It will be appreciated that the invention is not limited to the details of the embodiment described, which may be modified in many ways. Thus for example the method may be employed either by lowering the mould on to a stationary battery or by raising the battery into engagement with a stationary mould. Again the moulds may be connected together to seal a complete battery simultaneously, or individual moulds may be applied separately to the various connectors or again a single mould may be applied successively to one connector after another.

The method described provides a convenient way of forming an effective seal, completely surrounding the intercell connector bar, to prevent leakage of electrolyte between adjacent cells. In some cases the sealing material may be chosen to shrink more than the bar. As a further safeguard, or in particularly difficult conditions, the bar may be compressed longitudinally, after formation of the seal, to cause it to expand within the sealing material and cause the latter to grip the bar more firmly and further improve the seal.

What I claim as my invention and desire to secure by Letters Patent is:

1. In a method of sealing an intercell connection in a multicell electric storage battery in which the plates of neighboring cells are connected by a connector bar passing through an opening in the upper part of an intercell partition, which comprises placing over the intercell connector bar a mould in the form of a single moulding head and having a marginal portion fitting against each face of the partition and defining a moulding cavity surrounding the bar on each side of the partition, the mould comprising two halves, lying on opposite sides of the partition and each half comprising a body which forms one side wall of the cavity positioned against one side of the bar and on the opposite side of the bar provides guides for a closure member which is capable of moving substantially horizontally to closed position to completely surround the remaining sides of the bar, introducing into the mould a plastics material which is compatible with the partition so as to seal the gap between the margins of the opening and the connector bar, moving the closure member to an open position, and moving the sealed intercell connection downwardly relative to and out of the mould, the improvement comprising a cutter being provided on the end of the top portion of the closure member, moving the closure to a closed position and thereby gouging a groove in an upper surface of the bar so as to close the cavity throughout the whole width of the upper surface of the bar.

2. A method as claimed in claim 1 in which the cavity is closed at the top except for an injection nozzle through which sealing material can be injected under pressure.

3. A method as claimed in claim 1 in which each half of the mould comprises a body which forms the side of the cavity between the connector bar and the side of the casing nearest to it, the closure being withdrawn away from the said wall.

4. A method as claimed in claim 1 in which the closure also affords the end wall of the cavity under the connector bar.

5. A method as claimed in claim 1 in which the closure and an opposed part of the body are arranged to bite into the sides of the bar to close the cavity throughout the height of the bar.

6. A method as claimed in claim 1 which includes compressing the bar longitudinally, after moulding the seal, to cause it to expand within the sealing material.

7. A method as claimed in claim 1 in which the opening in the intercell partition is in the form of an open-topped notch through the lower part of which the intercell connector passes, and the cavity of the mould extends up to the level of the top of the partition so as to fill the upper part of the notch above the bar with the sealing material.

8. A method as claimed in claim 7 in which the thickness of the cavity over an area extending beyond the sides of the notch exceeds that of the partition while it has marginal portions fitting against the face of the partition to enclose the cavity.

* * * * *